United States Patent

[11] 3,569,738

[72] Inventor Thomas E. Osborne
San Francisco, Calif.
[21] Appl. No. 765,875
[22] Filed Oct. 8, 1968
[45] Patented Mar. 9, 1971
[73] Assignee Hewlett-Packard Company
Palo Alto, Calif.

[54] THRESHOLD SENSE AMPLIFIER FOR SMALL SIGNAL INPUT
5 Claims, 3 Drawing Figs.

[52] U.S. Cl. .......... 307/235, 307/267, 330/40
[51] Int. Cl. .......... H03k 5/20
[50] Field of Search .......... 307/235, 267; 328/115, 58; 330/22, 40

[56] References Cited
UNITED STATES PATENTS
3,364,365 1/1968 Eisenhauer .......... 307/235X

*Primary Examiner*—John S. Heyman
*Assistant Examiner*—John Zazworsky
*Attorney*—Stephen P. Fox

ABSTRACT: A transistor is responsive to small bipolar pulses superimposed on a relatively large common mode signal. An input network for the transistor rejects the common mode signal, and a biasing circuit biases the transistor in saturation at an operating point near its saturation breakpoint. The transistor amplifies and threshold detects the small input pulses and provides output pulses having a high signal-to-noise ratio. The output pulses are direct-coupled from a DC voltage source, so that DC restoration is not required. Another transistor provides feedback control of the input bias voltage and thereby stretches the output pulses.

INVENTOR
THOMAS E. OSBORNE
BY Stephen P. Fox
AGENT

THRESHOLD SENSE AMPLIFIER FOR SMALL SIGNAL INPUT

BACKGROUND OF THE INVENTION

There are many instances where it is necessary to sense the presence of a low voltage signal, on the order of a few millivolts, which is superimposed on a relatively large common mode voltage level, on the order of one volt or more. Typical of such instances is the detection of the outputs of ferrite square loop memory cores or read-only memories commonly found in digital computers.

Generally in prior art signal sensing techniques, only unipolar small signals may be detected. These small signals are first amplified and then "clipped" or threshold detected to eliminate ground noise and produce a reasonable signal-to-noise ratio. In order for the small signals to be properly threshold detected, the preceding amplification thereof must be in accordance with a precise amplification factor. Additionally, it is required that after amplification, the signals be restored to a predetermined DC voltage in order to produce the appropriate digital logic levels.

SUMMARY OF THE INVENTION

The present invention, in the illustrated embodiment, features a circuit which both amplifies and threshold senses small signals, thus obviating the need for separate precisely controlled amplifier stages. The combined amplifier-threshold detector includes a transistor biased in saturation at an operating point which is located at a predetermined millivolt increment from the transistor saturation breakpoint, i.e., the point at which the transistor operation changes from the saturated mode to the active mode. The input signals are coupled to the transistor through a capacitor which may be chosen with a predetermined value to permit amplification and threshold detection of bipolar rather than unipolar input signals. All input signals larger than the predetermined millivolt increment drive the transistor from the saturated to the active mode of operation and thereby produce an amplified threshold detected output. The threshold level is easily adjusted by changing the transistor bias. The transistor circuit has a toroid coupled input that rejects the common mode voltage level, and a direct coupled output that rejects the common mode voltage level, and a direct coupled output that eliminates the need for DC level restoration.

The invention additionally features circuitry for increasing or "stretching" the time duration of short output pulses from the combined amplifier and threshold detector, and for gating only selected pulses to an output. Pulse stretching is achieved by a transistor in a feedback configuration with the amplifier-threshold detector transistor. When the latter transistor is in the active mode of operation, the pulse stretching transistor conducts and causes a substantial decrease in forward bias of the amplifier-threshold detector transistor. The latter transistor returns to a saturated mode of operation after a predetermined time interval which is dependent on the time constant of the input biasing network. The output pulses may be gated so that the duration of each pulse corresponds to a portion of the time interval when the amplifier-threshold detector transistor is operating in the active mode.

The overall circuit utilizes few components and is compact and reliable. Operation is stable even with large variations in temperature.

DESCRIPTION OF THE PREFERRED EMBODIMENT

Figure 1:
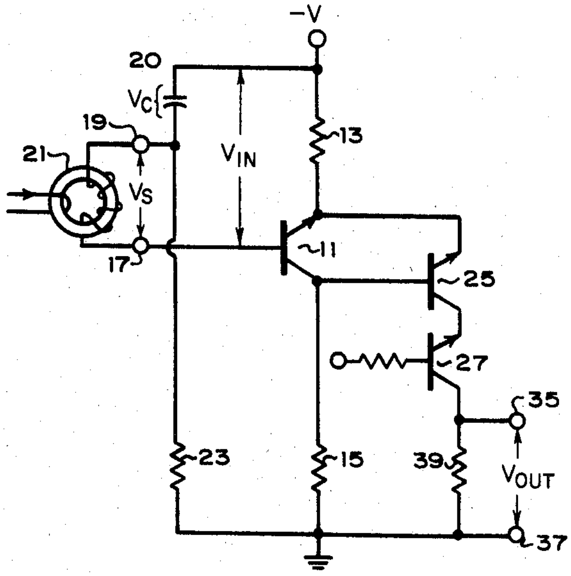
FIG. 1 is a schematic diagram of the preferred embodiment of the invention.

Referring now to FIG. 1, there is shown an NPN-type transistor 11, the emitter of which is connected through a biasing resistor 13 to a source of negative potential −V, and the collector of which is connected through a load resistor 15 to a source of oppositely poled or ground potential. A small signal input $V_S$ to be amplified and threshold detected is applied across a pair of input terminals 17, 19 which are connected to the input network in a series current path with a coupling capacitor 20, the emitter resistor 13 and the base-emitter junction of transistor 11. The small signal $V_S$ is typically on the order of 20 millivolts and is provided by a low impedance source such as the output from a memory element in a digital computer. A toroid transformer 21 is used to increase the magnitude of the small input signals and to reject any common mode DC voltage level on which the small signals may be superimposed.

The base-emitter junction of transistor 11 is forward biased into saturation by a resistor 23 connected from ground to the aforementioned series current path. In the illustrated embodiment, resistor 23 is connected directly to the capacitor 20; however, alternatively, this resistor may be connected directly to the base electrode of transistor 11. An output signal obtained at the collector electrode of transistor 11 is applied to pulse stretching and gating circuitry including transistors 25 and 27, hereinafter described.

Figure 2:
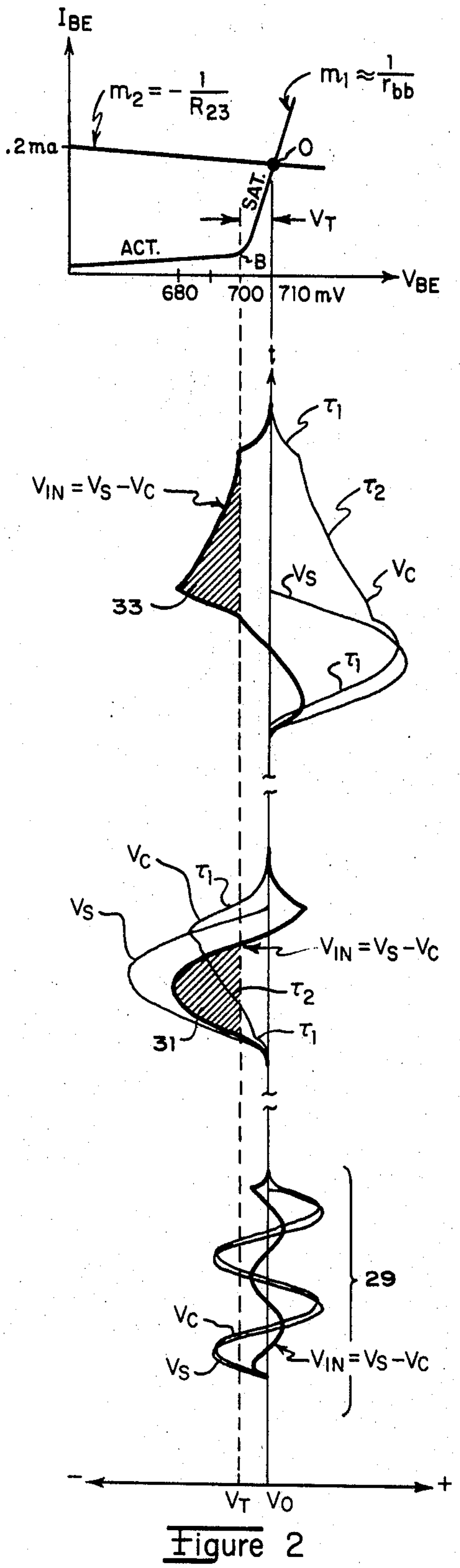
FIG. 2 is a combined graph of the input characteristic and various voltage waveforms illustrating the bipolar threshold-detecting operation of the invention.

The operation of transistor 11 may best be understood by reference to FIG. 2. Shown therein is a graph of the base-emitter current $I_{BE}$ as a function of the base-emitter input voltage $V_{BE}$. Transistor 11 may operate in an active mode (Act.), corresponding to the left-hand portion of the curve, or in a saturated mode (Sat.), corresponding to the right-hand portion of the curve. The point B on the curve between the active and saturated regions is commonly known as the saturation breakpoint. The lateral position and slope of the line corresponding to operation in the saturated mode is dependent on the value of the load resistor 15, the extrinsic base resistance $r_{bb}$ of transistor 11, and the operating temperature. A more complete description of this curve may be found in an article entitled "A Transistor Equivalent Circuit for Use in Switching Analysis," by S. B. Geller et al., IRE Transactions on Electronic Computers, Vol. EC-10, No. 4, Dec. 1961.

The $I_{BE}$ - $V_{BE}$ graph of FIG. 2 illustrates that transistor 11 has a saturation breakpoint at 700 mv. As noted hereinabove, this transistor is biased in saturation by resistor 23. The operating point 0 is at the intersection of the characteristic curve and the load line for the biasing resistor 23. This point is chosen to be a predetermined small threshold voltage increment, $V_T$, from the saturation breakpoint B by adjusting the value $R_{23}$ of resistor 23 when the voltage −V has a given magnitude. The emitter resistor 13 is very small compared to resistor 23 and therefore has negligible effect on the position of the operating point. As shown, the voltage increment $V_T$ is 10 mv. This increment is easily maintained constant since it depends mainly on the slope of the saturation line of the curve, which is a function of the extrinsic base-emitter resistance $r_{bb}$. The effect of an increase in temperature or in the value of load resistor 15 is to move the characteristic curve to the left and the breakpoint down. Leftward movement has no effect on the voltage increment $V_T$, however, and the downward movement has only a negligible effect of increasing $V_T$.

The lower portion of FIG. 2 illustrates typical voltage waveforms which may be encountered in operation of the circuit when the pulse stretching circuitry, hereinafter described, is gated off. The input signal $V_S$ is AC coupled to transistor 11 through capacitor 20 and thus is referenced to the operating point 0. The voltage $V_S$ may be either a positive or negative pulse with respect to the operating point, as shown.

The voltage across capacitor 20 is represented by the waveform $V_C$. This capacitor charges through the series current path including resistor 13, the base-emitter junction of transistor 11 and the low impedance source across input terminals 17, 19. Assuming that the impedance across the input terminals is small, and that resistor 23 is large, compared to resistor 13, the capacitor 20 will charge with a time constant, $\lambda_1$ or $\lambda_2$, depending upon whether transistor 11 is in the saturated or active modes, respectively. The values of $\lambda_1$ and $\lambda_2$ are as follows:

$$\tau_1 \approx C r_{bb} \qquad \tau_2 \approx C\left(r_{bb} + \frac{h_{fe}}{g_m}\right)$$

Where C is the value of capacitor 20, $h_{fe}$ is the forward current gain, $g_m$ is the intrinsic emitter conductance, and $r_{bb}$ is the aforementioned extrinsic base resistance of transistor 11.

The particular mode of operation (saturated or active) of transistor 11 is a function of its base-emitter junction voltage. This voltage is equal to the difference between $V_S$ and $V_C$, disregarding the negligible voltage drop across the small emitter resistor 13, and is represented by the heavy-line waveform $V_{in}$ in FIG. 2. Transistor 11 remains saturated until the magnitude of the voltage $V_{in}$ exceeds the voltage increment $V_T$. For $V_{in}$ greater than $V_T$, this transistor is driven into the active mode of operation and an output pulse is produced at the collector thereof. When the input pulse is negative going with respect to the operating point O, the time duration of the output pulse corresponds to the shaded area 31 under the waveform $V_{in}$.

In the waveforms 29 shown in FIG. 2, the voltage $V_S$ represents spurious noise signals that may appear across the input terminals 17, 19, Due to the effect of capacitor 20, the noise signal $V_{in}$ which appears across the transistor 11 is substantially less than the noise signal $V_S$. As long as the noise signals $V_{in}$ have a magnitude less than $V_T$ they do not switch the operating mode of transistor 11 and therefore have no effect on the output thereof. As a result of the threshold $V_T$, a high signal-to-noise ratio is provided at the output.

It is important to note that the circuit will threshold-sense input signals which are positive as well as negative with respect to the operating point 0. This is possible because the value of capacitor 20 is chosen small enough to permit the voltage thereacross to closely follow a positive going input pulse $V_S$ when the transistor 11 is operating in the saturated mode. As a result, and as shown in FIG. 2, capacitor 20 can charge up to a potential which exceeds the magnitude of $V_T$. Thereafter, when the capacitor discharges, the transistor 11 is driven into the active mode of operation for the time interval represented by the shaded area 33 of the waveform $V_{in}$. The output pulses from transistor 11 are increased in time duration, or stretched, by a circuit combination including the transistor 25, the conduction of which is controlled by the emitter-collector voltage of transistor 11. The stretched output pulses appear at a pair of output terminals 35, 37 which are connected across a resistor 39. The collector of transistor 25 is connected to resistor 39 through the transistor switch 27 which is gated on and off by suitable control signals applied to its base electrode.

Considering now the operation of the pulse stretching circuitry, when transistor 11 is saturated, the emitter-collector voltage is small and transistor 25 is biased into non-conduction. However, when transistor 11 switches to the active mode, its emitter-collector voltage is increased, thus causing transistor 25 to conduct additional current through emitter resist or 13, providing that the switching transistor 27 is gated on. As a result, the emitter of transistor 11 becomes more positive and this in turn drives the transistor more into the active mode. In effect the transistor 25 is in a feedback bias control loop from the output to the input of transistor 11.

Figure 3:
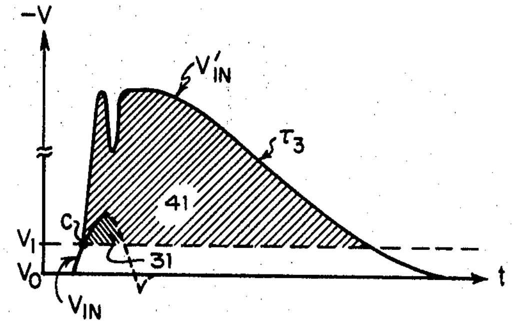
FIG. 3 is a graph illustrating the pulse stretching operation of the invention.

FIG. 3 illustrates the effect of the operation of transistor 25 the negative going input pulse $V_{in}$ shown in FIG. 2. As described hereinabove, when the pulse stretching circuit is inoperative, the time duration of the output signal at the collector of transistor 11 corresponds to the shaded portion 31 under the combined solid and dashed line curve. When the pulse stretching circuit is gated on, and when $V_{in}$ reaches a point C on the curve which preferably corresponds to the voltage level $V_T$, transistor 25 conducts, and the base-emitter junction of transistor 11 is suddenly driven toward a reverse-biased condition. Thereafter the base-emitter voltage of this transistor follows a different curve $V'_{in}$ which returns to the voltage $V_O$ at the operating point 0 after a predetermined time interval which is dependent on a time constant $\lambda_3$ corresponding to the time required for resistor 23 to charge capacitor 20. The dip in the curve $V'_{in}$ is caused by the "ringing" of the input circuit including the capacitor 20 and the inductive toroid 21. This dip does not affect the circuit output as long as it does not drop below the voltage level $V_T$. The shaded portion 41 under the curve $V'_{in}$ represents the stretched time interval during which transistor 11 operates in the active mode and keeps transistor 25 biased on to provide an output pulse at the terminals 35, 37. The pulse stretching circuit may increase the time duration of the output pulse by a factor of 10 or more times the duration of the input pulse.

The stretched output pulse is present across terminals 35, 37 only when transistor 27 is gated on. This transistor is connected in the circuit in a position such that it does not affect the operation of the previously described feedback bias control loop including transistors 11 and 25. Therefore, the pulse stretching circuit is not susceptible to any switching transients which may be developed during operation of the gating transistor 27.

I claim:

1. An amplifier circuit for threshold-sensing small bipolar input signals comprising:
   - a transistor having first and second main current carrying electrodes and a control electrode, said transistor having an input signal characteristic defining active and saturated modes of operation separated by a saturation breakpoint;
   - means providing opposite polarity voltages;
   - means for connecting said first main current carrying electrode to one of said opposite polarity voltages;
   - load resistor means for connecting said second main current carrying electrode to the other one of said two opposite polarity voltages;
   - output means coupled to said second main current carrying electrode;
   - means providing two terminals for receiving a bipolar input signal;
   - a capacitor;
   - means for coupling said two terminals, said capacitor, said control electrode and said first main current carrying electrode of said transistor in a series current path, said series current path having first and second predetermined time constants, said first time constant permitting said capacitor to charge at substantially the same rate as the rate of increase of said input signal when said transistor is in a saturated mode and said second time constant causing said capacitor to discharge at a rate substantially slower than the rate of decrease of said input signal when said transistor is in an active mode;
   - resistor means coupling said other one of said opposite polarity voltages to said series current path for biasing said transistor in said saturated mode at an operating point which is a predetermined voltage increment from said saturation breakpoint;
   - wherein said transistor is driven out of said saturated mode and into said active mode when said input signals to said terminal means are greater than said predetermined voltage increment and positive or negative with respect to said operating point.

4. The threshold-sensing amplifier circuit of claim 2, said means for coupling the second main current carrying electrode of said last named transistor to a said other one of the opposite polarity.

2. The threshold-sensing amplifier circuit of claim 1,
   - said means for connecting said first main current carrying electrode to said one of the opposite polarity voltages including a resistor;

said output means including switching means conductive when said transistor is in said active mode for increasing current through said last named resistor to drive said transistor further into said active mode and thereby increase the time duration of the output from said transistor, said switching means including:

a transistor having first and second main current carrying electrodes and a control electrode;

means for interconnecting the first main current carrying electrodes of said first and last-named transistors;

means for connecting the control electrode of said last-named transistor to the second main current carrying electrode of said first-named transistor; and means for coupling the second main current carrying electrode of said last-named transistor to said other one of said opposite polarity voltages.

3. The threshold-sensing amplifier circuit of claim 2 wherein said first and last-named transistors are of like conductivity-type. type.

4. The threshold-sensing amplifier circuit of claim 2, said means for coupling the second main current carrying electrode of said last-named transistor to said other one of the opposite polarity voltages including:

an output resistor;

terminal means for coupling the signal developed across said output resistor to a utilization device; and means for selectively gating signals from said second main current carrying electrode of said last-named transistor to said output resistor.

5. The circuit of claim 4 said selective gating means including a switching transistor.

UNITED STATES PATENT OFFICE
CERTIFICATE OF CORRECTION

Patent No. 3,569,738 Dated March 9, 1971

Inventor(s) Thomas E. Osborne

It is certified that error appears in the above-identified patent and that said Letters Patent are hereby corrected as shown below:

Column 1, lines 45-46, cancel "rejects the common mod voltage level, and a direct coupled output that";

Column 3, line 4, " $\lambda_1$" should read -- $\tau_1$ --; line 5 " $\lambda_2$" should read -- $\tau_2$ --; line 6, " $\lambda_1$ and $\lambda_2$" should read -- $\tau_1$ and $\tau_2$ --; line 46, immediately after "$V_{in}$." start a new paragraph beginning -- The output pulses --; line 63, "sist or" should read -- sistor --;

Column 4, cancel claim 4 on lines 68-71.

Signed and sealed this 5th day of October 1971.

(SEAL)
Attest:

EDWARD M.FLETCHER,JR.
Attesting Officer

ROBERT GOTTSCHALK
Acting Commissioner of Pate